US011859155B2

(12) United States Patent
Silvernail et al.

(10) Patent No.: US 11,859,155 B2
(45) **Date of Patent: *Jan. 2, 2024**

(54) HARD SURFACE CLEANING COMPOSITIONS COMPRISING PHOSPHINOSUCCINIC ACID ADDUCTS AND METHODS OF USE

(71) Applicant: ECOLAB USA INC., Saint Paul, MN (US)

(72) Inventors: Carter M. Silvernail, Saint Paul, MN (US); Erik C. Olson, Saint Paul, MN (US); Michel M. Lawrence, Saint Paul, MN (US); Richard D. Johnson, Saint Paul, MN (US); Steven J. Lange, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/303,682

(22) Filed: Jun. 4, 2021

(65) Prior Publication Data

US 2021/0363467 A1 Nov. 25, 2021

Related U.S. Application Data

(63) Continuation of application No. 15/974,130, filed on May 8, 2018, now Pat. No. 11,053,458, which is a continuation of application No. 14/260,901, filed on Apr. 24, 2014, now Pat. No. 9,994,799, which is a continuation-in-part of application No. 13/614,020, filed on Sep. 13, 2012, now Pat. No. 8,871,699, and a continuation-in-part of application No. 13/965,339, filed on Aug. 13, 2013, now Pat. No. 9,023,784.

(51) Int. Cl.

| | |
|---|---|
| ***C11D 3/36*** | (2006.01) |
| ***C11D 3/04*** | (2006.01) |
| ***C11D 3/08*** | (2006.01) |
| ***C11D 3/37*** | (2006.01) |
| ***C11D 3/395*** | (2006.01) |
| ***B08B 7/00*** | (2006.01) |
| ***B08B 9/20*** | (2006.01) |

(52) U.S. Cl.
CPC .............. *C11D 3/365* (2013.01); *C11D 3/044* (2013.01); *C11D 3/08* (2013.01)

(58) Field of Classification Search
None
See application file for complete search history.

(56) References Cited

U.S. PATENT DOCUMENTS

| | | | |
|---|---|---|---|
| 2,012,021 | A | 8/1932 | Petersen |
| 3,620,786 | A | 11/1971 | Hatch |
| 3,874,927 | A | 4/1975 | Willard, Sr. |
| 3,890,350 | A | 6/1975 | Hardtmann |
| 3,908,680 | A | 9/1975 | Krezanoski |
| 3,910,880 | A | 10/1975 | Lamberti |
| 3,959,168 | A | 5/1976 | Germscheid et al. |
| 4,190,551 | A | 2/1980 | Murata et al. |
| 4,536,313 | A | 8/1985 | Hignett et al. |
| 4,618,444 | A | 10/1986 | Hudson et al. |
| 4,632,741 | A | 12/1986 | Wolf et al. |
| 4,704,404 | A | 11/1987 | Sanderson |
| 4,732,694 | A | 3/1988 | Gowland et al. |
| 4,772,290 | A | 9/1988 | Mitchell et al. |
| 4,783,278 | A | 11/1988 | Sanderson et al. |
| 4,830,766 | A | 5/1989 | Gallup et al. |
| 5,018,577 | A | 5/1991 | Pardue et al. |
| 5,023,000 | A | 6/1991 | Kneller et al. |
| 5,030,240 | A | 7/1991 | Wiersema et al. |
| 5,085,794 | A | 2/1992 | Kneller et al. |
| 5,122,538 | A | 6/1992 | Lokkesmoe et al. |
| 5,246,620 | A | 9/1993 | Gethoffer et al. |
| 5,266,587 | A | 11/1993 | Sankey et al. |
| 5,279,757 | A | 1/1994 | Gethoffer et al. |
| 5,320,805 | A | 6/1994 | Kramer et al. |
| 5,385,680 | A | 1/1995 | Didier et al. |
| 5,454,982 | A | 10/1995 | Murch et al. |
| 5,463,112 | A | 10/1995 | Sankey et al. |
| 5,466,825 | A | 11/1995 | Carr et al. |
| 5,501,814 | A | 3/1996 | Engelskirchen et al. |
| 5,567,444 | A | 10/1996 | Hei et al. |
| 5,578,134 | A | 11/1996 | Lentsch et al. |
| 5,622,708 | A | 4/1997 | Richter et al. |
| 5,674,828 | A | 10/1997 | Knowlton et al. |

(Continued)

FOREIGN PATENT DOCUMENTS

| | | | |
|---|---|---|---|
| AU | 199911969 | B2 | 4/1999 |
| AU | 200185520 | A1 | 1/2002 |

(Continued)

OTHER PUBLICATIONS

US 7,851,571 B2, 12/2010, Rodrigues et al. (withdrawn)
European Patent Office, "Extended Search Report", issued in connection to European Application No. 13837225.5, dated May 13, 2016, 7 pages, dated May 13, 2016.
CN101228192—Kraton Polymers—English Translation May 25, 2011.
CN102844125—Ecolab USA Inc.—English Translation Dec. 26, 2012.
DE19906660—Haka Kunz GmbH—English Translation Jan. 27, 2000.
DE19949980—Henkel KGaA—English Translation Apr. 19, 2001.
DE10127919—Ecolab GMBH & Co.—English Translation Dec. 19, 2002.

(Continued)

*Primary Examiner* — Lorna M Douyon
(74) *Attorney, Agent, or Firm* — McKee, Voorhees & Sease, PLC

(57) ABSTRACT

Methods employing detergent compositions effective for reducing hard water scale and accumulation on hard surfaces, namely within food, beverage and pharmaceutical applications are disclosed. The detergent compositions employ phosphinosuccinic acid adducts in combination with an alkalinity source and optionally polymers, surfactants and/or oxidizers, providing alkaline compositions having a pH between about 10 and 13.5.

20 Claims, No Drawings

(56) References Cited

U.S. PATENT DOCUMENTS

| | | | | |
|---|---|---|---|---|
| 5,683,724 | A | 11/1997 | Hei et al. | |
| 5,686,401 | A | 11/1997 | Willey et al. | |
| 5,718,910 | A | 2/1998 | Oakes et al. | |
| 5,914,303 | A | 6/1999 | Sankey et al. | |
| 5,958,864 | A | 9/1999 | Artiga Gonzalez et al. | |
| 5,968,881 | A | 10/1999 | Haeggberg et al. | |
| 5,977,053 | A | 11/1999 | Groth et al. | |
| 6,024,986 | A | 2/2000 | Hei | |
| 6,028,104 | A | 2/2000 | Schmidt et al. | |
| 6,160,110 | A | 12/2000 | Thomaides et al. | |
| 6,197,739 | B1 | 3/2001 | Oakes et al. | |
| 6,197,897 | B1 | 3/2001 | Mazo et al. | |
| 6,204,234 | B1 | 3/2001 | Herbots et al. | |
| 6,204,238 | B1 | 3/2001 | Oftring et al. | |
| 6,238,685 | B1 | 5/2001 | Hei et al. | |
| 6,262,013 | B1 | 7/2001 | Smith et al. | |
| 6,271,190 | B1 | 8/2001 | Boskamp et al. | |
| 6,277,344 | B1 | 8/2001 | Hei et al. | |
| 6,302,968 | B1 | 10/2001 | Baum et al. | |
| 6,303,556 | B1 | 10/2001 | Kott et al. | |
| 6,310,025 | B1 | 10/2001 | Del Duca et al. | |
| 6,326,032 | B1 | 12/2001 | Richter et al. | |
| 6,342,472 | B1 | 1/2002 | Legel et al. | |
| 6,380,145 | B1 | 4/2002 | Herbots et al. | |
| 6,417,151 | B1 | 7/2002 | Grothus et al. | |
| 6,436,445 | B1 | 8/2002 | Hei et al. | |
| 6,468,955 | B1 | 10/2002 | Smets et al. | |
| 6,479,454 | B1 | 11/2002 | Smith et al. | |
| 6,492,316 | B1 | 12/2002 | Herbots et al. | |
| 6,495,357 | B1 | 12/2002 | Fuglsang et al. | |
| 6,506,737 | B1 | 1/2003 | Hei et al. | |
| 6,534,075 | B1 | 3/2003 | Hei et al. | |
| 6,541,436 | B1 | 4/2003 | Arvanitidou et al. | |
| 6,548,467 | B2 | 4/2003 | Baker et al. | |
| 6,572,789 | B1 | 6/2003 | Yang et al. | |
| 6,619,051 | B1 | 9/2003 | Kilawee et al. | |
| 6,624,133 | B1 | 9/2003 | McKenzi et al. | |
| 6,627,593 | B2 | 9/2003 | Hei et al. | |
| 6,627,657 | B1 | 9/2003 | Hilgren et al. | |
| 6,635,286 | B2 | 10/2003 | Hei et al. | |
| 6,693,069 | B2 | 2/2004 | Körber et al. | |
| 6,703,357 | B1 | 3/2004 | Maurer et al. | |
| 6,718,991 | B1 | 4/2004 | Breyer et al. | |
| 6,808,729 | B1 | 10/2004 | Roselle et al. | |
| 6,828,294 | B2 | 12/2004 | Kellar et al. | |
| 6,855,328 | B2 | 2/2005 | Hei et al. | |
| 6,866,888 | B2 | 3/2005 | Baker et al. | |
| 6,897,193 | B2 | 5/2005 | Kischkel et al. | |
| 6,903,064 | B1 | 6/2005 | Kasturi et al. | |
| 6,962,714 | B2 | 11/2005 | Hei et al. | |
| 6,964,787 | B2 | 11/2005 | Swart et al. | |
| 6,964,943 | B1 | 11/2005 | Bettiol et al. | |
| 6,982,241 | B2 | 1/2006 | Smith et al. | |
| 7,008,913 | B2 | 3/2006 | Hei et al. | |
| 7,056,536 | B2 | 6/2006 | Richter et al. | |
| 7,060,301 | B2 | 6/2006 | Wei et al. | |
| 7,074,749 | B2 | 7/2006 | Tropsch et al. | |
| 7,129,076 | B2 | 10/2006 | Poulose et al. | |
| 7,141,125 | B2 | 11/2006 | McKechnie et al. | |
| 7,153,817 | B2 | 12/2006 | Binder | |
| 7,179,778 | B2 | 2/2007 | Weber | |
| 7,226,898 | B2 | 6/2007 | Bragulla | |
| 7,250,159 | B1 | 7/2007 | Arnaud | |
| 7,320,887 | B2 | 1/2008 | Kottwitz et al. | |
| 7,323,438 | B2 | 1/2008 | Hedges et al. | |
| 7,438,767 | B2 | 10/2008 | McKechnie et al. | |
| 7,448,556 | B2 | 11/2008 | Muehlhausen et al. | |
| 7,462,375 | B2 | 12/2008 | Ge | |
| 7,470,655 | B2 | 12/2008 | Biering et al. | |
| 7,501,388 | B2 | 3/2009 | McClung | |
| 7,510,859 | B2 | 3/2009 | Wieland et al. | |
| 7,517,847 | B2 | 4/2009 | Catalfamo et al. | |
| 7,611,882 | B2 | 11/2009 | Bjornvad et al. | |
| 7,659,354 | B2 | 2/2010 | Song et al. | |
| 7,682,403 | B2 | 3/2010 | Gohl et al. | |
| 7,727,946 | B2 | 6/2010 | Catalfamo et al. | |
| 7,749,334 | B2 | 7/2010 | Biering et al. | |
| 7,754,670 | B2 | 7/2010 | Lange et al. | |
| 7,754,671 | B2 | 7/2010 | Lin et al. | |
| 7,816,555 | B2 | 10/2010 | Smith et al. | |
| 7,892,536 | B2 | 2/2011 | Kelemen et al. | |
| 7,910,647 | B2 | 3/2011 | Weide et al. | |
| 7,915,212 | B2 | 3/2011 | Yeung et al. | |
| 7,928,049 | B2 | 4/2011 | Wagner et al. | |
| 7,939,485 | B2 | 5/2011 | Price et al. | |
| 7,985,570 | B2 | 7/2011 | Wieland et al. | |
| 7,994,251 | B2 | 8/2011 | Rogmann et al. | |
| 8,012,267 | B2 | 9/2011 | Jekel et al. | |
| 8,022,027 | B2 | 9/2011 | Souter et al. | |
| 8,043,650 | B2 | 10/2011 | Gutzmann et al. | |
| 8,058,374 | B2 | 11/2011 | Rodrigues et al. | |
| 8,063,008 | B2 | 11/2011 | Dicosimo et al. | |
| 8,119,588 | B2 | 2/2012 | Bernhardt et al. | |
| 8,124,132 | B2 | 2/2012 | Hilgren et al. | |
| 8,178,352 | B2 | 5/2012 | Tokhtuev et al. | |
| 8,202,830 | B2 | 6/2012 | Miralles et al. | |
| 8,222,196 | B2 | 7/2012 | Smith et al. | |
| 8,246,906 | B2 | 8/2012 | Hei et al. | |
| 8,247,363 | B2 | 8/2012 | Fernholz et al. | |
| 8,748,365 | B2 | 6/2014 | Olson et al. | |
| 8,784,790 | B2 | 7/2014 | Myntti et al. | |
| 8,871,699 | B2 | 10/2014 | Silvernail et al. | |
| 8,940,676 | B2 | 1/2015 | Catlin et al. | |
| 8,999,399 | B2 | 4/2015 | Lisowsky et al. | |
| 9,018,142 | B2 | 4/2015 | Rovison, Jr. et al. | |
| 9,023,779 | B2 | 5/2015 | Miralles | |
| 9,023,784 | B2 | 5/2015 | Silvernail et al. | |
| 9,051,285 | B2 | 6/2015 | Rohwer et al. | |
| 9,255,242 | B2 | 2/2016 | Olson et al. | |
| 9,670,434 | B2 | 6/2017 | Silvernail et al. | |
| 9,752,105 | B2 * | 9/2017 | Stokes .................. | C11D 3/365 |
| 9,994,799 | B2 | 6/2018 | Silvernail et al. | |
| 10,358,622 | B2 | 7/2019 | Stokes et al. | |
| 10,377,971 | B2 | 8/2019 | Silvernail et al. | |
| 11,001,784 | B2 | 5/2021 | Silvernail et al. | |
| 11,053,458 | B2 * | 7/2021 | Silvernail ............. | C11D 3/044 |
| 2002/0013252 | A1 | 1/2002 | Schmiedel et al. | |
| 2002/0037824 | A1 | 3/2002 | Smets et al. | |
| 2002/0082181 | A1 | 6/2002 | Humphrey et al. | |
| 2002/0086903 | A1 | 7/2002 | Giambrone et al. | |
| 2002/0128312 | A1 | 9/2002 | Hei et al. | |
| 2002/0159917 | A1 | 10/2002 | Swart et al. | |
| 2002/0160930 | A1 | 10/2002 | Emmerson et al. | |
| 2002/0192340 | A1 | 12/2002 | Swart et al. | |
| 2003/0139310 | A1 | 7/2003 | Smith et al. | |
| 2003/0141258 | A1 | 7/2003 | Hatch | |
| 2003/0191040 | A1 | 10/2003 | Adriaanse et al. | |
| 2003/0194433 | A1 | 10/2003 | Hei et al. | |
| 2004/0146426 | A1 | 7/2004 | Biering et al. | |
| 2004/0194810 | A1 | 10/2004 | Strothoff et al. | |
| 2004/0259755 | A1 | 12/2004 | Orlich et al. | |
| 2005/0003979 | A1 | 1/2005 | Lentsch et al. | |
| 2005/0020464 | A1 | 1/2005 | Smith et al. | |
| 2005/0137107 | A1 | 1/2005 | Griese et al. | |
| 2005/0137105 | A1 | 6/2005 | Griese et al. | |
| 2005/0245411 | A1 | 11/2005 | Yang et al. | |
| 2005/0282261 | A1 | 12/2005 | Sauter et al. | |
| 2006/0003028 | A1 | 1/2006 | Myers et al. | |
| 2006/0069003 | A1 | 3/2006 | Song et al. | |
| 2006/0069004 | A1 | 3/2006 | Song et al. | |
| 2006/0113506 | A1 | 6/2006 | Man et al. | |
| 2006/0118141 | A1 | 6/2006 | Andriola et al. | |
| 2006/0122090 | A1 | 6/2006 | Spanier et al. | |
| 2006/0134239 | A1 | 6/2006 | Weide et al. | |
| 2006/0247144 | A1 | 11/2006 | Geret | |
| 2006/0270580 | A1 | 11/2006 | Smith et al. | |
| 2007/0020364 | A1 | 1/2007 | Burnett et al. | |
| 2007/0084650 | A1 | 4/2007 | Schwei et al. | |
| 2007/0111922 | A1 | 5/2007 | Tamura et al. | |
| 2007/0128129 | A1 | 6/2007 | Stehr et al. | |
| 2007/0155835 | A1 | 7/2007 | Weide et al. | |
| 2007/0173428 | A1 | 7/2007 | Appleby et al. | |
| 2007/0190177 | A1 | 8/2007 | Kling et al. | |
| 2008/0014284 | A1 | 1/2008 | Meyer et al. | |

(56) References Cited

U.S. PATENT DOCUMENTS

| | | | |
|---|---|---|---|
| 2008/0026026 | A1 | 1/2008 | Lu et al. |
| 2008/0076692 | A1 | 3/2008 | Carvell et al. |
| 2008/0118580 | A1 | 5/2008 | Bockmuhl et al. |
| 2008/0169243 | A1 | 7/2008 | Dave et al. |
| 2008/0234164 | A1 | 9/2008 | Tyborski |
| 2008/0261851 | A1 | 10/2008 | Barthel et al. |
| 2008/0263778 | A1 | 10/2008 | Baars et al. |
| 2008/0271760 | A1 | 11/2008 | Housemekerides et al. |
| 2008/0274930 | A1 | 11/2008 | Smith |
| 2009/0061017 | A1 | 3/2009 | Pedersen et al. |
| 2009/0101587 | A1 | 4/2009 | Blokker et al. |
| 2009/0288683 | A1 | 11/2009 | Cummings et al. |
| 2009/0325841 | A1 | 12/2009 | Erickson et al. |
| 2010/0075883 | A1 | 3/2010 | Geret et al. |
| 2010/0093587 | A1 | 4/2010 | Preuschen et al. |
| 2010/0144958 | A1 | 6/2010 | Findlay et al. |
| 2010/0189707 | A1 | 7/2010 | Barnett |
| 2010/0300044 | A1 | 12/2010 | Man et al. |
| 2010/0330013 | A1 | 12/2010 | O'Connell et al. |
| 2011/0165261 | A1 | 7/2011 | Derby et al. |
| 2011/0182959 | A1 | 7/2011 | Cahill et al. |
| 2011/0308553 | A1 | 12/2011 | Strothoff et al. |
| 2012/0046216 | A1 | 2/2012 | Hodge et al. |
| 2012/0121679 | A1 | 5/2012 | Cannon et al. |
| 2012/0128614 | A1 | 5/2012 | Rieth et al. |
| 2012/0165237 | A1 | 6/2012 | Silvernail |
| 2012/0208734 | A1 | 8/2012 | Eiting et al. |
| 2012/0291820 | A1 | 11/2012 | Strothoff et al. |

FOREIGN PATENT DOCUMENTS

| | | | |
|---|---|---|---|
| CA | 2122136 | A1 | 4/1993 |
| CA | 2163757 | C | 12/1994 |
| CA | 2314648 | A1 | 1/2001 |
| CA | 2314660 | A1 | 1/2001 |
| CA | 2448548 | A1 | 12/2002 |
| CA | 2450893 | A1 | 1/2003 |
| CA | 2531098 | A1 | 1/2005 |
| CA | 2567210 | A1 | 2/2006 |
| CN | 101622199 | A | 1/2010 |
| CN | 101228192 | B | 5/2011 |
| CN | 102844125 | A | 12/2012 |
| DE | 4324202 | A1 | 12/1994 |
| DE | 19639603 | A1 | 9/1996 |
| DE | 19754290 | A1 | 6/1999 |
| DE | 19906660 | A1 | 1/2000 |
| DE | 19949980 | A1 | 4/2001 |
| DE | 10127919 | A1 | 12/2002 |
| EP | 0133354 | A1 | 8/1983 |
| EP | 0096566 | A1 | 12/1983 |
| EP | 0256148 | A1 | 2/1988 |
| EP | 0383214 | A1 | 8/1990 |
| EP | 491391 | A1 | 12/1991 |
| EP | 0511081 | A1 | 10/1992 |
| EP | 0511091 | A1 | 10/1992 |
| EP | 0609273 | A1 | 8/1994 |
| EP | 0612843 | A1 | 8/1994 |
| EP | 0658594 | B1 | 6/1995 |
| EP | 0691398 | A1 | 1/1996 |
| EP | 0976867 | B1 | 2/2000 |
| EP | 1138335 | A1 | 3/2000 |
| EP | 1063281 | A2 | 12/2000 |
| EP | 1065261 | A2 | 1/2001 |
| EP | 1127939 | A1 | 8/2001 |
| EP | 1260234 | A1 | 4/2002 |
| EP | 1293215 | A1 | 3/2003 |
| EP | 1302108 | A2 | 4/2003 |
| EP | 1451243 | B9 | 9/2004 |
| EP | 1477552 | A1 | 11/2004 |
| GB | 1148046 | | 4/1969 |
| GB | 1222911 | A | 2/1971 |
| GB | 1351977 | | 5/1974 |
| GB | 1571357 | | 7/1980 |
| GB | 2427614 | | 1/2007 |
| IN | 200300222 | | 4/2005 |
| IN | 200000442 | | 4/2007 |
| IN | 200502145 | | 8/2007 |
| IN | 212385 | | 2/2008 |
| IN | 226322 | | 1/2009 |
| IN | 200902559 | | 12/2009 |
| IN | 201205604 | | 3/2014 |
| IN | 201301987 | | 9/2014 |
| IN | 201211025 | | 10/2014 |
| IN | 201401913 | | 3/2015 |
| IN | 201402010 | | 3/2015 |
| JP | 60228683 | A | 11/1985 |
| JP | 6112878 | A | 1/1986 |
| JP | 7330994 | A | 12/1995 |
| JP | 1150096 | A | 2/1999 |
| JP | 1161177 | A | 3/1999 |
| JP | 1161178 | A | 3/1999 |
| JP | 1161179 | A | 3/1999 |
| JP | 1161180 | A | 3/1999 |
| JP | 1161181 | A | 3/1999 |
| JP | 1161183 | A | 3/1999 |
| JP | 1161185 | A | 3/1999 |
| JP | 2001508110 | A | 6/2001 |
| JP | 3370571 | B2 | 11/2002 |
| JP | 2004532351 | A | 10/2004 |
| JP | 4851093 | B2 | 3/2006 |
| JP | 2006265469 | A | 10/2006 |
| JP | 2007246432 | A | 9/2007 |
| JP | 2008540732 | A | 11/2008 |
| JP | 2010515569 | A | 5/2010 |
| JP | 2010144087 | A | 7/2010 |
| JP | 2012507627 | A | 3/2012 |
| JP | 5036962 | B2 | 7/2012 |
| JP | 2013129808 | A | 7/2013 |
| JP | 2013158743 | A | 8/2013 |
| KR | 2006046896 | A | 5/2006 |
| KR | 20080099255 | A | 11/2008 |
| MX | 329088 | A | 3/2015 |
| WO | 199007501 | A1 | 7/1990 |
| WO | 9202309 | A1 | 2/1992 |
| WO | 9407982 | A1 | 4/1994 |
| WO | 199418299 | A1 | 8/1994 |
| WO | 9423000 | A1 | 10/1994 |
| WO | 199521290 | A1 | 8/1995 |
| WO | 9526392 | A1 | 10/1995 |
| WO | 9526393 | A1 | 10/1995 |
| WO | 9617920 | A1 | 6/1996 |
| WO | 9722651 | A1 | 6/1997 |
| WO | 9731999 | A1 | 9/1997 |
| WO | 9805749 | A1 | 2/1998 |
| WO | 9815607 | A1 | 4/1998 |
| WO | 9815608 | A1 | 4/1998 |
| WO | 9856760 | A1 | 12/1998 |
| WO | 9903962 | A1 | 1/1999 |
| WO | 9910466 | A1 | 3/1999 |
| WO | 9914304 | A1 | 3/1999 |
| WO | 9919449 | A1 | 4/1999 |
| WO | 9920729 | A1 | 4/1999 |
| WO | 199920726 | A1 | 4/1999 |
| WO | 9941350 | A1 | 8/1999 |
| WO | 9941351 | A1 | 8/1999 |
| WO | 0037041 | A1 | 6/2000 |
| WO | 0060042 | A1 | 10/2000 |
| WO | 0061715 | A1 | 10/2000 |
| WO | 0071651 | A2 | 11/2000 |
| WO | 200066810 | A1 | 11/2000 |
| WO | 0102528 | A1 | 1/2001 |
| WO | 0102529 | A1 | 1/2001 |
| WO | 0107551 | A1 | 2/2001 |
| WO | 0107560 | A1 | 2/2001 |
| WO | 0136579 | A1 | 5/2001 |
| WO | 0138471 | A1 | 5/2001 |
| WO | 0146358 | A2 | 6/2001 |
| WO | 0176442 | A1 | 10/2001 |
| WO | 0202725 | A1 | 1/2002 |
| WO | 02079105 | A1 | 10/2002 |
| WO | 03004408 | A1 | 1/2003 |
| WO | 03048291 | A1 | 6/2003 |
| WO | 03073849 | A1 | 9/2003 |
| WO | 2004091557 | A2 | 10/2004 |

(56) References Cited

FOREIGN PATENT DOCUMENTS

| | | | | |
|---|---|---|---|---|
| WO | WO 2005/000747 | A3 | * | 1/2005 |
| WO | 2005083049 | A2 | | 9/2005 |
| WO | 2005108644 | A2 | | 11/2005 |
| WO | 06105841 | A1 | | 10/2006 |
| WO | 06105863 | A1 | | 10/2006 |
| WO | 06108490 | A1 | | 10/2006 |
| WO | 2006121596 | A1 | | 11/2006 |
| WO | 07025603 | A1 | | 3/2007 |
| WO | 2008028896 | A2 | | 3/2008 |
| WO | 2008035071 | A1 | | 3/2008 |
| WO | 2008088975 | A1 | | 7/2008 |
| WO | 2008137790 | A2 | | 11/2008 |
| WO | 2009112992 | A1 | | 9/2009 |
| WO | 09122125 | A1 | | 10/2009 |
| WO | 2010000636 | A1 | | 1/2010 |
| WO | 2010033746 | A1 | | 3/2010 |
| WO | 2010033747 | A1 | | 3/2010 |
| WO | 10146543 | A1 | | 12/2010 |
| WO | 2011014783 | A1 | | 2/2011 |
| WO | 2011024094 | A2 | | 3/2011 |
| WO | 11070392 | A1 | | 6/2011 |
| WO | 2011089493 | A1 | | 7/2011 |
| WO | 2011161459 | A1 | | 12/2011 |
| WO | 12014016 | A1 | | 2/2012 |
| WO | 12028196 | A1 | | 3/2012 |
| WO | 12036702 | A1 | | 3/2012 |
| WO | 2012028203 | A1 | | 3/2012 |
| WO | 2012042000 | A1 | | 4/2012 |
| WO | 12128629 | A1 | | 9/2012 |
| WO | 2012155986 | A1 | | 11/2012 |
| WO | 2012156369 | A1 | | 11/2012 |

OTHER PUBLICATIONS

DE4324202—Henkel Ecolab GMBH & Co.—English Translation Dec. 1, 1994.
JP4851093—Novo Enzyme Akuti Angeles Cub Graphics—English Translation Mar. 23, 2006.
JPS60228683—Mitsubishi Electric—English Translation Nov. 13, 1985.
JPS6112878—Mitsubishi Electric—English Translation Jan. 21, 1986.
JP7330994—Nippon Synthetic Chemical Industry—English Translation Dec. 19, 1995.
EP0256148—Jon A. Benckiser—English Translation Feb. 24, 1988.
EP0511081—Roquette Freres—English Translation Oct. 28, 1992.
EP1451243—Roquette Freres—English Translation Sep. 1, 2004.
EP0609273—Henkel Kommanditgesellschaft—English Translation Aug. 10, 1994.
WO 94/07982—Henkel Kommanditgesellschaft—English Translation Apr. 14, 1994.
WO 01/46358—Henkel Kommanditgesellschaft—English Translation Jun. 28, 2001.
JP2006-265469, Daisan Kogyo Kk,—English Translation, Oct. 5, 2006.
Sasol, “Specialty Ethoxylates based on short chain alcohols”, Sasol Performance Chemicals booklet, 20 pages, Sep. 9, 2015.

* cited by examiner

HARD SURFACE CLEANING COMPOSITIONS COMPRISING PHOSPHINOSUCCINIC ACID ADDUCTS AND METHODS OF USE

CROSS-REFERENCE TO RELATED APPLICATIONS

This application is a continuation of U.S. application Ser. No. 15/974,130, filed May 8, 2018, now U.S. Pat. No. 11,053,458, issued Jul. 6, 2021, which is a continuation of U.S. application Ser. No. 14/260,901, filed Apr. 24, 2014, now U.S. Pat. No. 9,994,799, issued Jun. 12, 2018, which is a continuation-in-part of U.S. application Ser. No. 13/614,020, filed Sep. 13, 2012, now U.S. Pat. No. 8,871,699, issued Oct. 28, 2014, titled Detergent Composition Comprising Phosphinosuccinic Acid Adducts and Methods of Use, and Ser. No. 13/965,339, filed Aug. 13, 2013, now U.S. Pat. No. 9,023,784, issued May 5, 2015, titled Methods of Reducing Soil Redeposition on a Hard Surface Using Phosphinosuccinic Acid Adducts, all of which are herein incorporated by reference in their entirety.

This application is also related to U.S. application Ser. No. 13/614,150, filed Sep. 13, 2012, now U.S. Pat. No. 8,748,365, issued Jun. 10, 2024, titled Solidification Matrix Comprising Phosphinosuccinic Acid Derivatives, which is herein incorporated by reference in its entirety.

FIELD OF THE INVENTION

The invention relates to cleaning compositions and methods of cleaning food, beverage, and/or pharmaceutical equipment, and the like). The detergent compositions employ phosphinosuccinic acid adducts, namely mono-, bis- and oligomeric phosphinosuccinic acid (PSO) derivatives, in combination with an alkalinity source and optionally polymers and/or surfactants. Beneficially, methods employing the detergent compositions prevent and/or minimize hard water scale accumulation in alkaline conditions between about 10 and 13.5.

BACKGROUND OF THE INVENTION

In many industrial applications, such as the manufacture of foods and beverages, hard surfaces commonly become contaminated with soils such as carbohydrate, proteinaceous, and hardness soils, food oil soils and other soils. Such soils can arise from the manufacture of both liquid and solid foodstuffs. Carbohydrate soils, such as cellulosics, monosaccharides, disaccharides, oligosaccharides, starches, gums and other complex materials, when dried, can form tough, hard to remove soils, particularly when combined with other soil components such as proteins, fats, oils and others. The removal of such carbohydrate soils can be a significant problem. Similarly, other materials such as proteins, fats and oils can also form hard to remove soil and residues. Food and beverage soils are particularly tenacious when they are heated during processing. Foods and beverages are heated for a variety of reasons during processing. Also, many food and beverage products are concentrated or created as a result of evaporation.

Cleaning techniques are a specific regimen adapted for removing soils from the internal components of tanks, lines, pumps and other process equipment used for processing typically liquid product streams such as beverages, milk, juices, etc. Cleaning involves passing solutions through the system and then resuming the normal food, beverage and/or pharmaceutical process. Often cleaning methods involve a first rinse, the application of the cleaning solutions, a second rinse with potable water followed by resumed operations. The process can also include any other contacting step in which a rinse, acidic or basic functional fluid, solvent or other cleaning component such as hot water, cold water, etc. can be contacted with the equipment at any step during the process. Often the final potable water rinse is skipped in order to prevent contamination of the equipment with bacteria following the cleaning and/or sanitizing step.

Cleaning of food, beverage and/or pharmaceutical equipment often requires a complete or partial shutdown of the equipment being cleaned, which results in lost production time or compromised cleaning. There is a need therefore for improved detergent compositions and methods for cleaning such equipment. An exemplary schematic diagram of a process and equipment to be cleaned is described in U.S. Pat. No. 8,114,222, which is incorporated herein by reference in its entirety.

Alkali metal hydroxide containing detergents are often referred to as caustic detergents. Caustic detergents, along with those employing alkali metal silicates and/or metasilicates are commonly used in food and beverage applications to provide effective detergency. However, high alkalinity in the presence of hard water is problematic due to formation, precipitation and deposition of water hardness scale on treated surfaces, including for example metal, plastic, glass, rubber, etc. Therefore, water treatment components are commonly added to alkaline detergents, including for example phosphorus raw materials and other water conditioning agents.

As the use of phosphates in detergents becomes more heavily regulated, industries are seeking cost effective ways to control hard water scale formation associated with highly alkaline detergents without sacrificing cleaning performance.

Therefore, there is a need for alkaline detergent compositions for use in cleaning applications to provide adequate cleaning performance while controlling hardness scale accumulation on hard surfaces in contact with the detergent compositions. Such hard surfaces may include, for example, the interior parts of processing equipment, including that customarily found within food, beverage and pharmaceutical systems.

Accordingly, it is an objective of the claimed invention to develop alkaline detergent compositions effective for reducing and/or substantially preventing hardness scale build up on hard surfaces while maintaining effective detergency.

A further object of the invention is to provide methods for employing alkaline detergents between pHs from about 10 to about 13.5, wherein the compositions may be provided in various forms, including liquids, solids, powders, pastes and/or gels, such that use solutions may be obtained at a point of use or may be used without further dilution in the case of concentrate compositions.

A still further object of the invention is to employ mono-, bis- and oligomeric phosphinosuccinic acid (PSO) adducts and provide efficient alkaline detergency while minimizing significant hardness build up and/or accumulation on treated hard surfaces.

BRIEF SUMMARY OF THE INVENTION

The following invention is advantageous for minimizing hard water scale accumulation on hard surfaces. In an embodiment, a detergent composition comprises a phosphinosuccinic acid adducts comprising a phosphinosuccinic acid and mono-, bis- and oligomeric phosphinosuccinic acid adducts, and an alkalinity source comprising an alkali metal hydroxide, metasilicate, and/or silicate. In an aspect, a use solution of the detergent composition has a pH between about 10 and 13.5. In a further embodiment, the detergent composition comprises a phosphinosuccinic acid adduct comprising a phosphinosuccinic acid and mono-, bis- and oligomeric phosphinosuccinic acid adducts having the following formulas:

(I)

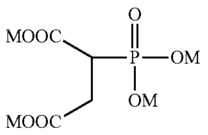

(II)

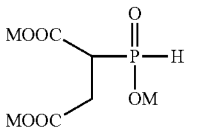

(III)

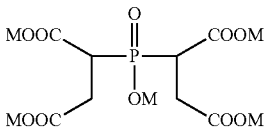

(IV)

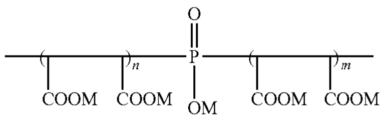

wherein M is selected from the group consisting of $H^+$, $Na^+$, $K^+$, $NH_4^+$, and mixtures thereof, wherein m plus n is greater than 2, and an alkalinity source comprising an alkali metal hydroxide and optionally an alkali metal silicate or alkali metal metasilicate. In a still further aspect, the phosphinosuccinic acid adduct of the detergent composition comprises at least 10 mol % of an adduct comprising a ratio of succinic acid to phosphorus from about 1:1 to 20:1, and the phosphinosuccinic acid adduct of formula I constitutes between about 1-40 wt-% of the phosphinosuccinic acid adduct, the phosphinosuccinic acid adduct of formula II constitutes between about 1-25 wt-% of the phosphinosuccinic acid adduct, the phosphinosuccinic acid adduct of formula III constitutes between about 10-60 wt-% of the phosphinosuccinic acid adduct, the phosphinosuccinic acid adduct of formula IV constitutes between about 20-70 wt-% of the phosphinosuccinic acid adduct. In a still further embodiment the composition further includes a polycarboxylic acid polymer and/or hydrophobically modified polycarboxylic acid polymer. In still further embodiments, the composition further includes a surfactant and/or an oxidizer.

In a further embodiment, a method of reducing or preventing hardness accumulation on a hard surface comprises contacting a hard surface with the detergent composition according to the invention, wherein a use solution of the detergent composition has a pH between about 10 and 13.5. In an aspect, the methods further include the step of reducing and/or preventing hardness build up on the hard surface.

In a still further embodiment, a method of reducing or preventing hardness accumulation on a hard surface in a clean-in-place cleaning application comprises contacting a hard surface with an alkaline detergent composition, and reducing and/or preventing hardness build up on the treated hard surface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

The present invention relates to detergent compositions that employ phosphinosuccinic acid and mono-, bis- and oligomeric phosphinosuccinic acid adducts with alkali metal hydroxides, alkali metal silicates, alkali metal metasilicates and combinations thereof. The detergent compositions may further include a compound selected from the group consisting of gluconic acid or salts thereof, a copolymer of acrylic and maleic acids or salts thereof, sodium hypochlorite, sodium dichloroisocyanurate and combinations thereof. The detergent compositions and methods of use thereof have many advantages over conventional alkaline detergents. For example, the detergent compositions minimize soil and hard water scale accumulation on hard surfaces under alkaline conditions from about 10 to about 13.5.

The embodiments of this invention are not limited to particular alkaline detergent compositions, and methods of using the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "cleaning," as used herein, refers to performing or aiding in any soil removal, bleaching, microbial population reduction, or combination thereof.

The term "defoamer" or "defoaming agent," as used herein, refers to a composition capable of reducing the stability of foam. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. Nos. 3,048,548, 3,334,147, and 3,442,242, the disclosures of which are incorporated herein by reference.

The terms "feed water," "dilution water," and "water" as used herein, refer to any source of water that can be used with the methods and compositions of the present invention. Water sources suitable for use in the present invention include a wide variety of both quality and pH, and include but are not limited to, city water, well water, water supplied by a municipal water system, water supplied by a private water system, and/or water directly from the system or well. Water can also include water from a used water reservoir, such as a recycle reservoir used for storage of recycled water, a storage tank, or any combination thereof. Water also includes food process or transport waters. It is to be understood that regardless of the source of incoming water for systems and methods of the invention, the water sources may be further treated within a manufacturing plant. For example, lime may be added for mineral precipitation, carbon filtration may remove odoriferous contaminants, additional chlorine or chlorine dioxide may be used for disinfection or water may be purified through reverse osmosis taking on properties similar to distilled water.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this patent application, successful microbial reduction is achieved when the microbial populations are reduced by at least about 50%, or by significantly more than is achieved by a wash with water. Larger reductions in microbial population provide greater levels of protection.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

According to an embodiment of the invention, alkaline detergents incorporate phosphinosuccinic acid (PSO) adducts. In an aspect, the alkaline detergents comprise, consist of and/or consist essentially of phosphinosuccinic acid (PSO) adducts and a source of alkalinity. In a further aspect, the alkaline detergents comprise, consist of and/or consist essentially of phosphinosuccinic acid (PSO) adducts, an alkali metal hydroxide, an alkali metal silicate and/or alkali metal metasilicate, and a polymer, such as polycarboxylic acids or hydrophobically modified polycarboxylic acids. The compositions may also include water, surfactants and/or other polymers, oxidizers, additional functional ingredients and any combination of the same. Additional detergent compositions may incorporate the PSO adducts according to the invention, including for example, those disclosed in U.S. Publication No. 2014/0073550, having beneficial solid, dimensional stability, which is herein incorporated by reference.

An example of a suitable detergent composition for use according to the invention may comprise, consist and/or consist essentially of about 1-90 wt-% alkali metal hydroxide (or combinations of alkali metal hydroxide and alkali metal metasilicates and/or alkali metal silicates), from about 1-90 wt-% of the alkalinity source(s) from about 1-50 wt-% of the alkalinity source(s), and preferably about 1-40 wt-% alkali metal hydroxide, alkali metal metasilicates and/or alkali metal silicates; about 0.01-40 wt-% PSO adducts, preferably about 0.1-20 wt-% PSO adducts; about 0-45 wt-% polymers (e.g. polycarboxylic acids and/or hydrophobically modified polycarboxylic acids), preferably from about 0-25 wt-% polymers; and optionally other chelating agents, polymers and/or surfactants, oxidizers, and other functional ingredients, including for example preferably about 0-40 wt-% surfactant, and more preferably from about 0-25 wt-% surfactant.

An example of a suitable detergent use solution composition for use according to the invention may comprise, consist and/or consist essentially of about from about 100-20,000 ppm of an alkalinity source, from about 1-2,000 ppm phosphinosuccinic acid adducts, and from about 1-1,000 ppm of a polymer having a use pH of between about 10 and about 13.5.

Further description of suitable formulations is shown below:

| Formulations | | | |
|---|---|---|---|
| Water | 0-90 wt-% | 20-90 wt-% | 40-80 wt-% |
| Alkalinity source (e.g. sodium hydroxide (beads) and/or alkali metal silicates and/or metasilicates) | 1-90 wt-% | 1-50 wt-% | 1-40 wt-% |

-continued

| Formulations | | | |
|---|---|---|---|
| PSO adducts | 0.01-40 wt-% | 0.1-20 wt-% | 0.1-10 wt-% |
| Optional Polymers (e.g. poly carboxylic acids) | 0-45 wt-% | 0-25 wt-% | 0-10 wt-% |
| Optional Surfactant(s) | 0-40 wt-% | 0-25 wt-% | 0-10 wt-% |
| Optional Additional Agents | 0-40 wt-% | 0-25 wt-% | 0-20 wt-% |

Use solutions of the detergent compositions have a pH greater than about 10. In further aspects, the pH of the detergent composition use solution is between about 10 and 13.5. Beneficially, the detergent compositions of the invention provide effective prevention of hardness scale accumulation on treated surfaces at such alkaline pH conditions. Without being limited to a particular theory of the invention, it is unexpected to have effective cleaning without the accumulation of hardness scaling at alkaline conditions above pH about 10 wherein alkalinity sources (e.g. sodium hydroxide, sodium metasilicate and/or sodium silicate) are employed.

Beneficially, alkaline compositions according to the invention may be provided in various forms, including liquids, solids, powders, pastes and/or gels. Moreover, the alkaline compositions can be provided in use concentration and/or concentrates, such that use solutions may be obtained at a point of use or may be used without further dilution in the case of concentrate compositions. The alkaline compositions are suitable for dilution with a water source.

Phosphinosuccinic Acid (PSO) Adducts

The detergent compositions employ phosphinosuccinic acid (PSO) adducts providing water conditioning benefits including the reduction of hardness scale buildup. PSO adducts may also be described as phosphonic acid-based compositions. In an aspect of the invention, the PSO adducts are a combination of mono-, bis- and oligomeric phosphinosuccinic acid adducts and a phosphinosuccinic acid (PSA) adduct.

The phosphinosuccinic acid (PSA) adducts have the formula (I) below:

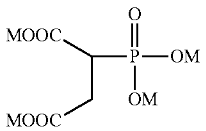

The mono-phosphinosuccinic acid adducts have the formula (II) below:

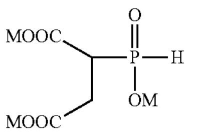

The bis-phosphinosuccinic acid adducts have the formula (III) below:

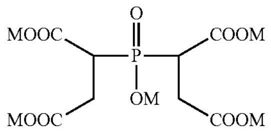

An exemplary structure for the oligomeric phosphinosuccinic acid adducts is shown in formula (IV) below:

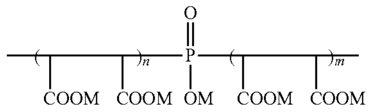

where M is $H^+$, $Na^+$, $K^+$, $NH_4^+$, or mixtures thereof; and the sum of m plus n is greater than 2.

In an aspect, the phosphinosuccinic acid adducts are a combination of various phosphinosuccinic acid adducts as shown in Formulas I-IV. In a preferred aspect, the phosphinosuccinic acid adduct of formula I constitutes between about 1-40 wt-% of the phosphinosuccinic acid adducts, the phosphinosuccinic acid adduct of formula II constitutes between about 1-25 wt-% of the phosphinosuccinic acid adducts, the phosphinosuccinic acid adduct of formula III constitutes between about 10-60 wt-% of the phosphinosuccinic acid adducts, the phosphinosuccinic acid adduct of formula IV constitutes between about 20-70 wt-% of the phosphinosuccinic acid adduct. Without being limited according to embodiments of the invention, all recited ranges for the phosphinosuccinic acid adducts are inclusive of the numbers defining the range and include each integer within the defined range.

Additional oligomeric phosphinosuccinic acid adduct structures are set forth for example in U.S. Pat. Nos. 5,085,794, 5,023,000 and 5,018,577, each of which are incorporated herein by reference in their entirety. The oligomeric species may also contain esters of phosphinosuccinic acid, where the phosphonate group is esterified with a succinate-derived alkyl group. Furthermore, the oligomeric phosphinosuccinic acid adduct may comprise 1-20 wt % of additional monomers selected, including, but not limited to acrylic acid, methacrylic acid, itaconic acid, 2-acylamido-2-methylpropane sulfonic acid (AMPS), and acrylamide.

The adducts of formula I, II, III and IV may be used in the acid or salt form. Further, in addition to the phosphinosuccinic acids and oligomeric species, the mixture may also contain some phosphinosuccinic acid adduct (I) from the oxidation of adduct II, as well as impurities such as various inorganic phosphorous byproducts of formula $H_2PO_2$—, $HPO_3^{2-}$ and $PO_4^{3-}$.

In an aspect, the mono-, bis- and oligomeric phosphinosuccinic acid adducts and the phosphinosuccinic acid (PSA) may be provided in the following mole and weight ratios as shown in Table 1.

TABLE 1

| Species: | Mono | PSA | Bis | Oligomer |
|---|---|---|---|---|
| Formula | $C_4H_7PO_6$ | $C_4H_7PO_7$ | $C_8H_{11}PO_{10}$ | $C_{14.1}H_{17.1}PO_{16.1}$ |
| MW | 182 | 198 | 298 | 475.5 (avg) |
| Mole fraction (by NMR) | 0.238 | 0.027 | 0.422 | 0.309 |
| Wt. fraction (as acid) | 0.135 | 0.017 | 0.391 | 0.457 |

Detergent compositions and methods of use may employ the phosphinosuccinic acid adducts and may include one or more of PSO adducts selected from mono-, bis- and oligomeric phosphinosuccinic acid and a phosphinosuccinic acid, wherein at least about 10 mol % of the adduct comprises a succinic acid:phosphorus ratio of about 1:1 to about 20:1. More preferably, the phosphinosuccinic acid adduct may include one or more of the PSO adducts selected from mono-, bis- and oligomeric phosphinosuccinic acid and optionally a phosphinosuccinic acid wherein at least about 10 mol % of the adduct comprises a succinic acid:phosphorus ratio of about 1:1 to about 15:1. Most preferably, the phosphinosuccinic acid adduct may include one or more adducts selected from mono-, bis- and oligomeric phosphinosuccinic acid and optionally a phosphinosuccinic acid wherein at least about 10 mol % of the adduct comprises a succinic acid:phosphorus ratio of about 1:1 to about 10:1.

Additional description of suitable mono-, bis- and oligomeric phosphinosuccinic acid adducts for use as the PSO adducts of the present invention is provided in U.S. Pat. No. 6,572,789 which is incorporated herein by reference in its entirety.

In aspects of the invention the detergent composition is nitrilotriacetic acid (NTA)-free to meet certain regulations. In additional aspects of the invention the detergent composition may be substantially phosphorous (and phosphate) free to meet certain regulations. The PSO adducts of the claimed invention may provide substantially phosphorous (and phosphate) free detergent compositions having less than about 0.5 wt-% of phosphorus (and phosphate). More preferably, the amount of phosphorus is a detergent composition may be less than about 0.1 wt-%. Accordingly, it is a benefit of the detergent compositions of the present invention to provide detergent compositions capable of controlling (i.e. preventing) hardness scale accumulation and soil redeposition on a substrate surface without the use of phosphates, such as tripolyphosphates including sodium tripolyphosphate, commonly used in detergents to prevent hardness scale and/or accumulation.

Alkalinity Source

According to an embodiment of the invention, the detergent compositions include an alkalinity source. Exemplary alkalinity sources include alkali metal hydroxides. In various aspects, a combination of both alkali metal hydroxides and alkali metal silicates and/or alkali metal metasilicates are employed as the alkalinity source.

Alkali metal hydroxides used in the formulation of detergents are often referred to as caustic detergents. Examples of suitable alkali metal hydroxides include sodium hydroxide, potassium hydroxide, and lithium hydroxide. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, i.e. the alkali metal hydroxide, the detergent composition may comprise a secondary alkalinity source. Examples of useful secondary alkaline sources include, but are not limited to: alkali metal silicates or metasilicates, such as sodium or potassium silicate or metasilicate; and ethanolamines and amines. Such alkalinity agents are commonly available in either aqueous or powdered form, either of which is useful in formulating the present detergent compositions.

An effective amount of one or more alkalinity sources is provided in the detergent composition. An effective amount is referred to herein as an amount that provides a use composition having a pH of at least about 10, preferably at least about 10.5. When the use composition has a pH of about 10, it can be considered mildly alkaline, and when the pH is greater than about 12, the use composition can be considered caustic. In some circumstances, the detergent composition may provide a use composition that has a pH between about 10 and about 13.5.

Additional Functional Ingredients

The components of the detergent composition can be combined with various additional functional ingredients. In some embodiments, the detergent composition including the PSO adducts and alkalinity source(s) make up a large amount, or even substantially all of the total weight of the detergent composition, for example, in embodiments having few or no additional functional ingredients disposed therein. In these embodiments, the component concentrations ranges provided above for the detergent composition are representative of the ranges of those same components in the detergent composition. In other aspects, the detergent compositions include PSO adducts, alkali metal hydroxide and/or alkali metal silicate and/or metasilicate alkalinity source(s), threshold active polymer(s)/surfactant(s), and water, having few or no additional functional ingredients disposed therein. In still other aspects, the detergent compositions include PSO adducts, alkali metal hydroxide alkalinity source and/or alkali metal silicates and/or metasilicate, and a polycarboxylic acid polymer and/or hydrophobically modified polycarboxylic acid polymer, having few or no additional functional ingredients disposed therein.

The functional ingredients provide desired properties and functionalities to the detergent composition. For the purpose of this application, the term “functional ingredients” includes an ingredient that when dispersed or dissolved in a use and/or concentrate, such as an aqueous solution, provides a beneficial property in a particular use. Some particular examples of functional ingredients are discussed in more detail below, although the particular materials discussed are given by way of example only, and that a broad variety of other functional ingredients may be used. For example, many of the functional ingredients discussed below relate to materials used in cleaning applications. However, other embodiments may include functional ingredients for use in other applications.

Exemplary additional functional ingredients include for example: builders or water conditioners, including detergent builders; hardening agents; bleaching agents; fillers; defoaming agents; anti-redeposition agents; stabilizing agents; dispersants; oxidizers; chelants; fragrances and dyes; thickeners; etc. Further description of suitable additional functional ingredients is set forth in U.S. Patent Publication No. 2012/0165237, which is incorporated herein by reference in its entirety.

Polymers

In some embodiments, the compositions of the present invention include a water conditioning polymer. Water conditioning polymers suitable for use with the compositions of the present invention include, but are not limited to polycarboxylates or polycarboxylic acids. Exemplary polycarboxylates that can be used as builders and/or water conditioning polymers include, but are not limited to: those having pendant carboxylate ($—CO_2^-$) groups such as acrylic homopolymers, polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers.

In another aspect, the polycarboxylic acid polymer may be a non-phosphorus polymer. In a still further aspect, the polycarboxylic acid polymer may be hydrophobically modified. In a still further aspect, the polycarboxylic acid polymer may be a neutralized polycarboxylic acid polymer. An example of a suitable commercially-available polymer includes Acumer® 1000 (available from Dow Chemical). For a further discussion of water conditioning polymers, see Kirk-Othmer, Encyclopedia of Chemical Technology, Third Edition, volume 5, pages 339-366 and volume 23, pages 319-320, the disclosure of which is incorporated by reference herein.

In an aspect where a water conditioning polymer is employed, it is preferred that between about 0-45 wt-% polymer are included in the composition, preferably from about 0-25 wt-% polymer, and more preferably from about 0-10 wt-% polymer.

Surfactants

In some embodiments, the compositions of the present invention include at least one surfactant. Surfactants suitable for use with the compositions of the present invention include, but are not limited to, anionic surfactants, nonionic surfactants, cationic surfactants, amphoteric surfactants and/or zwitterionic surfactants. In a preferred aspect, anionic surfactants are employed. In some embodiments, the compositions of the present invention include about 0-40 wt-% of a surfactant. In other embodiments the compositions of the present invention include about 0-25 wt-% of a surfactant.

In certain embodiments of the invention the detergent composition does not require a surfactant and/or other polymer in addition to the PSO adducts. In alternative embodiments, the detergent compositions employ at least one anionic surfactant to provide improved detergency to the composition. In an embodiment, the detergent composition employs a sulfonate, sulphate or carboxylate anionic surfactant. In a further embodiment, the detergent compositions employ at least one nonionic surfactant and an anionic surfactant.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

Generally, anionics have high foam profiles which may limit applications of use for cleaning systems such as CIP circuits that require strict foam control. However, other applications of use, including high foaming applications are suitable for using anionic surface active compounds to impart special chemical or physical properties. The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Anionic sulfonate surfactants suitable for use in the present compositions include alkyl sulfonates, the linear and branched primary and secondary alkyl sulfonates, and the aromatic sulfonates with or without substituents. Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Particularly suitable anionic sulfonates include alkyldiphenyloxide disulfonates, including for example C6 alkylated diphenyl oxide disulfonic acid, commercially-available under the tradename Dowfax.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic carboxylate surfactants may further include polycarboxylates or related copolymers. A variety of such polycarboxylate polymers and copolymers are known and described in patent and other literature, and are available commercially. Exemplary polycarboxylates that may be utilized according to the invention include for example: homopolymers and copolymers of polyacrylates; polymethacrylates; polymalates; materials such as acrylic, olefinic and/or maleic polymers and/or copolymers. Various examples of commercially-available agents, namely acrylic-maleic acid copolymers include, for example: Acusol 445N and Acusol 448 (available from Dow Chemical. Examples of suitable acrylic-maleic acid copolymers include, but are not limited to, acrylic-maleic acid copolymers having a molecular weight of between about 1,000 to about 100,000 g/mol, particularly between about 1,000 and about 75,000 g/mol and more particularly between about 1,000 and about 50,000 g/mol.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

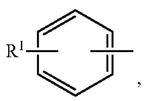

, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

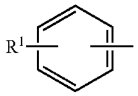

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates; capped alcohol alkoxylates; mixtures thereof, or the like.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Block polyoxypropylene-polyoxyethylene polymeric compounds based upon propylene glycol, ethylene glycol, glycerol, trimethylolpropane, and ethylenediamine as the initiator reactive hydrogen compound are suitable nonionic surfactants. Examples of polymeric compounds made from a sequential propoxylation and ethoxylation of initiator are commercially available under the trade names Pluronic® and Tetronic® manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Semi-Polar Nonionic Surfactants

The semi-polar type of nonionic surface active agents are another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

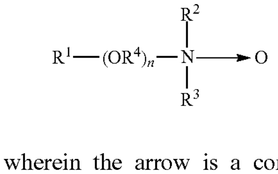

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure;

$R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful semi-polar nonionic surfactants also include the water soluble phosphine oxides having the following structure:

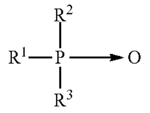

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Semi-polar nonionic surfactants useful herein also include the water soluble sulfoxide compounds which have the structure:

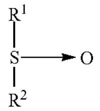

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms. Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Preferred semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Alkoxylated amines or, most particularly, alcohol alkoxylated/aminated/alkoxylated surfactants are also suitable for use according to the invention. These non-ionic surfactants may be at least in part represented by the general formulae: $R^{20}$—$(PO)_S$N-$(EO)_t$H, $R^{20}$—$(PO)_S$N-$(EO)_t$H$(EO)_t$H, and $R^{20}$—N$(EO)_t$H; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—N$[(EO)_wH][(EO)_zMH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphino. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

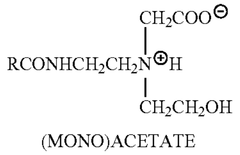

(MONO)ACETATE

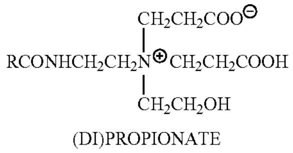

(DI)PROPIONATE

-continued

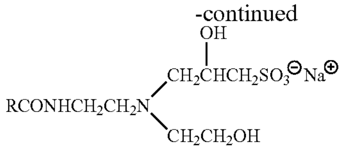

AMPHOTERIC
SLUFONATE

Neutral pH - Zwitterion wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J. A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y—and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution. The simplest cationic amines, amine salts and quaternary ammonium compounds can be schematically drawn thus:

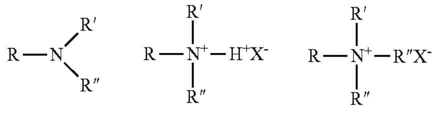

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility. The majority of large volume commercial cationic surfactants can be subdivided into four major classes and additional sub-groups known to those or skill in the art and described in "Surfactant Encyclopedia", Cosmetics & Toiletries, Vol. 104 (2) 86-96 (1989), which is herein incorporated by reference in its entirety. The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like. Cationic surfactants useful in the compositions of the present invention include those having the formula R1mR2×YLZ wherein each R1 is an organic group containing a straight or branched alkyl or alkenyl group optionally substituted with up to three phenyl or hydroxy groups and optionally interrupted by up to four of the following structures:

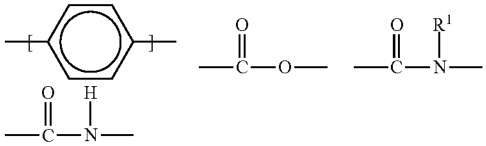

or an isomer or mixture of these structures, and which contains from about 8 to 22 carbon atoms. The R1 groups can additionally contain up to 12 ethoxy groups. m is a number from 1 to 3. Preferably, no more than one R1 group in a molecule has 16 or more carbon atoms when m is 2 or more than 12 carbon atoms when m is 3. Each R2 is an alkyl or hydroxyalkyl group containing from 1 to 4 carbon atoms or a benzyl group with no more than one R2 in a molecule being benzyl, and x is a number from 0 to 11, preferably from 0 to 6. The remainder of any carbon atom positions on the Y group are filled by hydrogens. Y is can be a group including, but not limited to:

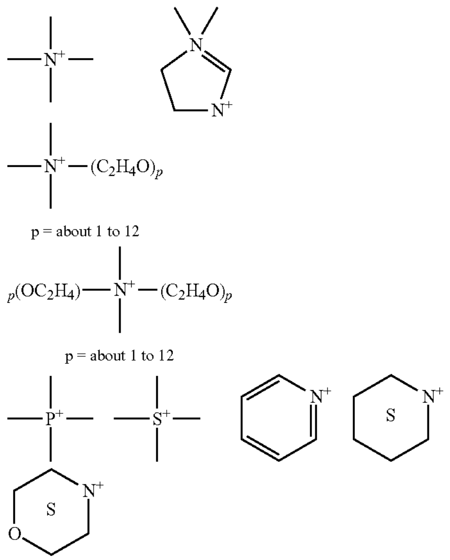

or a mixture thereof. Preferably, L is 1 or 2, with the Y groups being separated by a moiety selected from R1 and R2 analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong “inner-salt” attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

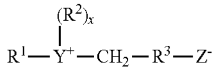

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

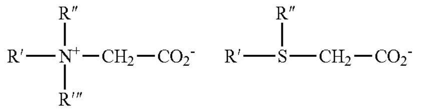

-continued

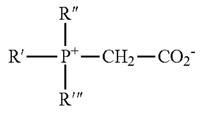

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12}$-16 acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678, which is herein incorporated by reference in its entirety. Further examples are given in "Surface Active Agents and Detergents" (Vol. I and II by Schwartz, Perry and Berch), which is herein incorporated by reference in its entirety.

Detergent Builders

The composition can include one or more building agents, also called chelating or sequestering agents (e.g., builders), including, but not limited to: condensed phosphates, alkali metal carbonates, phosphonates, aminocarboxylic acids, aminocarboxylates and their derivatives, ethylenediamine and ethylenetriamine derivatives, hydroxyacids, and mono-, di-, and tri-carboxylates and their corresponding acids, and/or polyacrylates. In general, a chelating agent is a molecule capable of coordinating (i.e., binding) the metal ions commonly found in natural water to prevent the metal ions from interfering with the action of the other detersive ingredients of a cleaning composition. In a preferred embodiment, the detergent composition does not comprise a phosphate builder.

Other chelating agents include nitroloacetates and their derivatives, and mixtures thereof. Examples of aminocarboxylates include amino acetates and salts thereof. Suitable amino acetates include: N-hydroxyethylaminodiacetic acid; hydroxyethylenediaminetetraacetic acid; nitrilotriacetic acid (NTA); ethylenediaminetetraacetic acid (EDTA); N-hydroxyethyl-ethylenediaminetriacetic acid (HEDTA); tetrasodium ethylenediaminetetraacetic acid (EDTA); diethylenetriaminepentaacetic acid (DTPA); and alanine-N,N-diacetic acid; n-hydroxyethyliminodiacetic acid; and the like; their alkali metal salts; and mixtures thereof. Suitable aminophosphates include nitrilotrismethylene phosphates and other aminophosphates with alkyl or alkaline groups with less than 8 carbon atoms. Exemplary polycarboxylates iminodisuccinic acids (IDS), sodium polyacrylates, citric acid, gluconic acid, oxalic acid, salts thereof, mixtures thereof, and the like. Additional polycarboxylates include citric or citrate-type chelating agents, polymeric polycarboxylate, and acrylic or polyacrylic acid-type chelating agents. Additional chelating agents include polyaspartic acid or co-condensates of aspartic acid with other amino acids, $C_4$-$C_{25}$-mono-or-dicarboxylic acids and $C_4$-$C_{25}$-mono-or-diamines. Exemplary polymeric polycarboxylates include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed poly amide-methacrylamide copolymers, hydrolyzed poly acrylonitrile, hydrolyzed polymethacrylonitrile, hydrolyzed acrylonitrile-methacrylonitrile copolymers, and the like.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent.

In a preferred aspect, the chelant is gluconic acid, EDTA or an alkali metal salt thereof.

Preferable levels of addition for builders that can also be chelating or sequestering agents are between about 0.001% to about 70% by weight, about 0.001% to about 60% by weight, or about 0.01% to about 50% by weight. If the composition is provided as a concentrate, the concentrate can include between approximately 0.001% to approximately 50% by weight, between approximately 0.001% to approximately 35% by weight, and between approximately 0.001% to approximately 30% by weight of the builders.

Oxidizer

An oxidizing agents for use in the detergent compositions may also be included, and may be referred to as a bleaching agent as it may provide lightening or whitening of a substrate. An oxidizer may include bleaching compounds capable of liberating an active halogen species, such as $Cl_2$, $Br_2$, —OCl and/or —OBr—, under conditions typically encountered during the cleansing process. Suitable bleaching agents for use in the present detergent compositions include, for example, chlorine-containing compounds such as a chlorine, a hypochlorite (e.g. sodium hypochlorite), and/or chloramine. Preferred halogen-releasing compounds include the alkali metal dichloroisocyanurates, such as sodium dichloroisocyanurate, chlorinated trisodium phosphate, the alkali metal hypochlorites, monochlorarrine and dichloramine, and the like. An oxidizer may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

A detergent composition may include a minor but effective amount of an oxidizer, preferably about 0.1-30 wt-%, and more preferably from about 1-15 wt-%. In a preferred aspect, the oxidizer is a alkali metal hypochlorite.

Formulations

The detergent compositions according to the invention may be formulated into solids, liquids, powders, pastes, gels, etc.

Solid detergent compositions provide certain commercial advantages for use according to the invention. For example, use of concentrated solid detergent compositions decrease shipment costs as a result of the compact solid form, in comparison to bulkier liquid products. In certain embodiments of the invention, solid products may be provided in the form of a multiple-use solid, such as, a block or a plurality of pellets, and can be repeatedly used to generate aqueous use solutions of the detergent composition for multiple cycles or a predetermined number of dispensing cycles. In certain embodiments, the solid detergent compositions may have a mass greater than about 5 grams, such as for example from about 5 grams to 10 kilograms. In certain embodiments, a multiple-use form of the solid detergent composition has a mass of about 1 kilogram to about 10 kilogram or greater.

Methods of Use

The compositions of the invention are suitable for use in various applications and methods, including any application suitable for an alkali metal hydroxide, alkali metal metasilicate and/or alkali metal silicate detergent. In a particular aspect, the compositions of the invention are suitable for use in cleaning food, beverage and/or pharmaceutical equipment/processes as they beneficially reduce hard water scale within the cleaning applications. The methods of use may be desirable in additional applications where industrial standards are focused on the quality of the treated surface and/or the hard surfaces comprising the machinery or components wherein the surfaces are treated, such that the prevention of hard water scale build up provided by the detergent compositions of the invention are desirable.

Preventing Hard Water Scale in Cleaning Applications

The methods of the invention are particularly suited for methods employing alkaline detergents in need of preventing hard water scale accumulation on surfaces within food, beverage and/or pharmaceutical applications. In addition, the methods of the invention are well suited for controlling water hardness buildup on a plurality of surfaces. The methods of the invention prevent moderate to heavy accumulation hardness on treated substrate surfaces beneficially alleviating negative impacts of insufficient cleaning, decreasing product quality, reduced heat transfer and/or decreased water flow within a system. Moreover, the methods of the invention further improve the aesthetic appearance of the surface. In certain embodiments, surfaces in need of hard water scale accumulation prevention, include for example, plastics, metal and/or glass surfaces, namely those in food and beverage applications, such as clean-in-place systems.

As used herein, clean-in-place (CIP) cleaning techniques refer a specific cleaning and/or disinfection regimen adapted for removing soils from the internal components of tanks, lines, pumps and other process equipment used for processing, often food and/or beverage processing. Typically the product streams are liquid such as beverages, milk, juices, etc. Clean-in-place cleaning involves passing cleaning solutions of the compositions according to the invention through the system without dismantling any system components.

The methods for cleaning equipment using CIP cleaning procedures includes for example, such equipment as evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, and tanks. The methods can be used in generally any applications where caked on soil or burned on soil, such as proteins or carbohydrates, needs to be removed; applications include the food and beverage industry (especially dairy), brewing, oil processing, industrial agriculture and ethanol processing.

CIP processing is generally a well-known process, including applying a dilute solution (typically about 0.5-3%) onto the surface to be cleaned. The solution flows across the surface (typically about 3 to 6 feet/second), slowly removing the soil. Either new solution is re-applied to the surface, or the same solution is recirculated and re-applied to the surface.

In a minimum aspect, the methods for a clean-in-place technique according to the invention involve passing a cleaning solution of the compositions of the invention through the equipment and then resuming normal processing. Beneficially, these clean-in-place cleaning techniques are adapted for removing soils from interior surfaces of a wide variety of parts of processing equipment, such as pipes, tubing, connections, tanks, storage reservoirs and the like.

In further aspects, the methods remove a soil (including organic, inorganic or a mixture of the two components) can further include the steps of applying an acid solution wash and/or a fresh water rinse, in addition to the alkaline solution wash according to the compositions of the invention. Without being limited to a particular mechanism of action, the alkaline solution softens the soils and removes the organic alkaline soluble soils. The optional use of subsequent acid solution may be beneficial to remove mineral soils left behind by the alkaline cleaning step. The strength of the alkaline and acid solutions and the duration of the cleaning steps are typically dependent on the durability of the soil. The water rinse removes any residual solution and soils, and cleans the surface prior to the equipment being returned on-line.

In an aspect of the invention, the CIP methods include an apparatus or system in need of cleaning, such as a tank. In an aspect, a feed line supplies the alkaline cleaning composition according to the invention to the tank, and a drain line removes the solution from tank. A system or apparatus may further have operably connected via appropriate pipes, valves, pumps, etc. equipment for the CIP process. A CIP process may further includes a tank for retaining the dilute CIP chemistry. A drain line from the tank is used to recirculate solution from tank back to CIP process and tank.

The methods of the invention beneficially reduce the formation, precipitation and/or deposition of hard water scale, such as calcium carbonate, on hard surfaces contacted by the detergent compositions. In an embodiment, the detergent compositions are employed for the prevention of formation, precipitation and/or deposition of hard water scale on hard surfaces, such as those contacted in clean-in-place cleaning. The detergent compositions according to the invention beneficially provide such prevention of formation, precipitation and/or deposition of hard water scale despite the high alkalinity of the detergent composition use solutions (e.g. pH between about 10 and 13.5) in the presence of hard water.

The compositions of the invention may be formulated prior to the point of use as a single or multiple component product. For example, the compositions of the invention may be formulated with both the alkali metal hydroxide and PSO adducts and may be used as a single cleaning composition between pH of about 10 and 13.5. The composition may comprise additional components such as for example, nonionic surfactants, anionic surfactants, polymers, oxidizers and corrosion inhibitors.

The compositions of the invention may also be generated at the point of use. For example, the alkali metal hydroxide and PSO adducts may be added separately to the clean-in-place process. The PSO component may be added in acidic or neutralized form and combined with the alkali metal hydroxide to form a use solution between pH of about 10-13.5. Both the alkali metal hydroxide and PSO adduct solutions may comprise additional components such as for example, nonionic surfactants, anionic surfactants, polymers, oxidizers and corrosion inhibitors.

Preventing Hard Water Scale in Foam Cleaning Applications

The methods of the invention also suited for methods employing high foaming alkaline detergents in need of preventing hard water scale accumulation on treated surfaces. The methods of the invention prevent moderate to heavy accumulation hardness on treated substrate surfaces beneficially alleviating negative impacts of insufficient cleaning, providing improved aesthetic appearances, including on the visible, exterior surfaces of machinery and other hard surfaces. In certain embodiments, surfaces in need of hard water scale accumulation prevention, include for example, plastics, metal and/or glass surfaces, namely those in food and beverage applications, such as for example the exterior surfaces commonly found in food-and-beverage CIP systems.

The methods for cleaning exterior portions/surfaces of equipment and hard surfaces in need of high foaming alkaline detergent compositions are particularly suitable for manual cleaning processes (as distinguished from the automated CIP cleaning procedures described above). Automated cleaning employing alkaline detergent compositions according to the invention can be done safely at a wide range of temperatures and a wide range of pressure applications (including under high pressure). In such aspects, cleaning solutions as well as rinse water is applied to a surface manually under a range of pressure to facilitate soil removal from the surfaces. Instead of the recirculation which may be employed in an automated systems (e.g. CIP), the mechanical solution flow can be used to remove soils according to manual methods.

In an aspect of the invention employing manual cleaning operations, surfaces may include those in open, large facility environments. The alkaline detergent composition is applied to a surface in need of treatment through manual application. In such cleaning operations, residence time on a surface of the alkaline detergent composition (often in the form of foam or a gel, especially for vertical surfaces) provides cleaning efficacy without the accumulation of hardness scale. In other aspects, high temperature rinse water can be further employed to effectively clean a surface.

In a minimum aspect, the methods for a manual cleaning technique according to the invention involve applying a cleaning solution of the compositions of the invention onto a hard surface and allowing residence time on the surface for the detergency effect. The methods further include the step of applying rinse water and/or other rinse aid to remove the alkaline detergent composition.

In further aspects, the methods remove a soil (including organic, inorganic or a mixture of the two components) can further include the steps of applying an acid solution wash and/or a fresh water rinse, in addition to the alkaline solution wash according to the compositions of the invention. Without being limited to a particular mechanism of action, the alkaline solution softens the soils and removes the organic alkaline soluble soils. The optional use of subsequent acid solution may be beneficial to remove mineral soils left behind by the alkaline cleaning step. The strength of the alkaline and acid solutions and the duration of the cleaning steps are typically dependent on the durability of the soil. The water rinse removes any residual solution and soils, and cleans the surface prior to the equipment being returned on-line.

The methods of the invention beneficially reduce the formation, precipitation and/or deposition of hard water scale, such as calcium carbonate, on hard surfaces contacted by the detergent compositions. In an embodiment, the detergent compositions are employed for the prevention of formation, precipitation and/or deposition of hard water scale on hard surfaces, such as external surfaces of machinery in food-and-beverage applications. The detergent compositions according to the invention beneficially provide such prevention of formation, precipitation and/or deposition of hard water scale despite the high alkalinity of the detergent composition use solutions (e.g. pH between about 10 and 13.5) in the presence of hard water.

Preventing and or Minimizing Hardness Accumulation

The methods of the invention are particularly suited for methods employing alkaline detergents in need of preventing hardness (e.g. calcium carbonate) accumulation on surfaces. Hardness accumulation is particularly detrimental to surfaces used in detergent cleaning applications for the interior surfaces, such as CIP applications, as it may result in the formation of build up or accumulation decreasing fluid transfer within the system, having distinct soiled appearance, in addition to the hardness scaling covering a surface. The methods of the invention are well suited for preventing hardness accumulation on a plurality of surfaces. The methods of the invention reduce and/or substantially prevent hardness accumulation on treated surfaces.

In an aspect, the methods according to the invention provide reduction and/or prevention of hardness accumulation on treated surfaces over conventional phosphate-based alkaline detergents, such as those containing tripolyphosphates. In some aspects, the hardness accumulation is reduced by at least about 10% in comparison to conventional phosphate-based alkaline detergents, preferably at least about 20% in comparison to conventional phosphate-based alkaline detergents, or greater. In still a further aspect, the methods according to the invention provide at least substantially similar (e.g. meet performance) hardness accumulation prevention in comparison to phosphate-free alkaline detergents that do not contain the PSO adducts according to the invention.

In an aspect, the methods of reducing hardness accumulation include contacting a hard surface with a detergent composition, wherein the detergent composition comprises, consists of and/or consists essentially of (a) an alkali metal hydroxide and/or alkali metal silicates and/or metasilicates, and (b) phosphinosuccinic acid adducts or adducts having at least one of the following formulas:

(I)

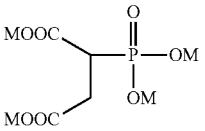

(II)

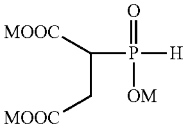

(III)

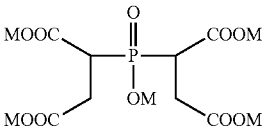

-continued (IV)

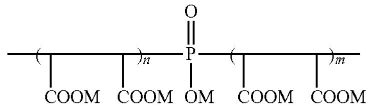

where M is selected from the group consisting of $H^+$, $Na^+$, $K^+$, $NH_4^+$, and mixtures thereof, wherein m plus n is greater than 2. The additional embodiments of the alkaline detergent composition are suitable for use according to the methods of the invention. Preferably, the contacting step with the detergent composition is during a washing step of a CIP cleaning cycle.

The time for contacting the hard surface in need of treatment, namely within a CIP application, may vary depending on factors such as size, alkalinity of the detergent composition, amount of soil therein, etc.

The detergent compositions are effective at preventing hard water scale accumulation in hard surface cleaning applications, including preferably CIP applications, using a variety of water sources, including hard water.

The various methods of use according to the invention employ the use of the detergent composition, which may be formed prior to or at the point of use by combining the PSO adducts, alkalinity source and other desired components (e.g. optional polymers and/or surfactants) in the weight percentages disclosed herein. The detergent composition may be provided in various formulations. The methods of the invention may employ any of the formulations disclosed, including for example, liquids, semi-solids and/or other solids, powders, pastes and/or gel formulations. The methods of invention may also employ the detergent compositions which are provided (or sourced) in one or more parts. In an aspect, the detergent composition may be formed at a point of use such as where a two (or more) part composition is combined to form the detergent composition. In an exemplary aspect, the detergent composition comprising and/or consisting of the PSO derivations (and optionally polymers, surfactants, additional alkalinity sources and/or additional functional ingredients) may be combined with an alkali metal hydroxide alkalinity source (e.g. a commodity caustic source).

The methods of the invention may also employ a concentrate and/or a use solution constituting an aqueous solution or dispersion of a concentrate. Such use solutions may be formed during the washing process.

In aspects of the invention employing packaged solid detergent compositions, the products may first require removal from any applicable packaging (e.g. film). Thereafter, according to certain methods of use, the compositions can be inserted directly into a dispensing apparatus and/or provided to a water source for cleaning according to the invention. Examples of such dispensing systems include for example U.S. Pat. Nos. 4,826,661, 4,690,305, 4,687,121, 4,426,362 and U.S. Pat. Nos. RE 32,763 and 32,818, the disclosures of which are incorporated by reference herein in its entirety. Ideally, a solid detergent composition is configured or produced to closely fit the particular shape(s) of a dispensing system in order to prevent the introduction and dispensing of an incorrect solid product into the apparatus of the present invention.

In certain embodiments, the detergent composition may be mixed with a water source prior to or at the point of use. In other embodiments, the detergent compositions do not require the formation of a use solution and/or further dilution and may be used without further dilution.

In aspects of the invention employing solid detergent compositions, a water source contacts the detergent composition to convert solid detergent compositions, particularly powders, into use solutions. Additional dispensing systems may also be utilized which are more suited for converting alternative solid detergents compositions into use solutions. The methods of the present invention include use of a variety of solid detergent compositions, including, for example, extruded blocks or "capsule" types of package.

In an aspect, a dispenser may be employed to spray water (e.g. in a spray pattern from a nozzle) to form a detergent use solution. For example, water may be sprayed toward an apparatus or other holding reservoir with the detergent composition, wherein the water reacts with the solid detergent composition to form the use solution. In certain embodiments of the methods of the invention, a use solution may be configured to drip downwardly due to gravity until the dissolved solution of the detergent composition is dispensed for use according to the invention. In an aspect, the use solution may be dispensed into a wash solution of a ware wash machine.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting examples. It should be understood that these examples, while indicating certain embodiments of the invention, are given by way of illustration only. From the above discussion and the examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Hard water film accumulation testing was conducted using a light box evaluation of 100 cycle glasses. The 100 cycle experiment was performed using six 10 oz. Libby glasses on a Hobart AM-15 ware wash machine employing 17 grain water (hard water source). Initially the glasses were prepared using a cleaning cycle to completely remove all film and foreign material from the glass surface. The evaluated compositions are shown in Table 2. The experimental formulations shown in Table 3 provided 40% active salt and 31% active as an acid. A use concentration of 0.716 g/L was employed for the evaluated formulations.

TABLE 2

| Raw material | Ex 1 | Ex 2 | Ex 3 |
|---|---|---|---|
| Water | 14.3 | 14.3 | 14.3 |
| Sodium hydroxide (beads) | 69.8 | 69.8 | 69.8 |
| Pluronic N3: EP/PO copolymers | 0.9 | 0.9 | 0.9 |
| PSO adducts | 5 | 7.5 | 10 |
| Acusol 445N (45%): polycarboxylic acid | 10 | 7.5 | 5 |

The ware wash machine controller was set to automatically dispense the indicated amount of detergent into the wash tank. Six clean glasses (G=glass tumblers) were placed in a Raburn rack. The ware wash machine automatically dispensed into the ware wash machine the detergent compositions to achieve the desired concentration and maintain the initial concentration. The glasses were dried overnight and then the film accumulation using a strong light source was evaluated.

The light box test standardizes the evaluation of the glasses run in the 100 cycle test. The light box test is based on the use of an optical system including a photographic camera, a light box, a light source and a light meter. The system is controlled by a computer program (Spot Advance and Image Pro Plus). To evaluate the glasses after the 100 cycle test, each glass was placed on the light box resting on its side and the intensity of the light source was adjusted to a predetermined value using a light meter. The conditions of the 100 cycle test were entered into the computer. A picture of the glass was taken with the camera and saved on the computer for analysis by the program. The picture was analyzed using the upper half of the glass in order to avoid the gradient of darkness on the film from the top of the glass to the bottom of the glass, based on the shape of the glass.

Generally, a lower light box rating indicates that more light was able to pass through the glass. Thus, the lower the light box rating, the more effective the composition was at preventing scaling on the surface of the glass. Light box evaluation of a clean, unused glass has a light box score of approximately 12,000 which corresponds to a score of 72,000 for the sum of 6 glasses. Table 2 shows the results of the light box test.

Table 3 shows the results of the light box test.

TABLE 3

| | Use | Light Box Scores | | |
|---|---|---|---|---|
| Example | Concentration | Glasses | Plastic | Sum |
| Example 1 | 716 ppm | 202346 | 33122 | 235468 |
| Example 2 | 716 ppm | 246853 | 36741 | 283594 |
| Example 3 | 716 ppm | 170870 | 37571 | 208441 |

The results demonstrate that the PSO is suitable for combination with polymers according to an aspect of the invention. Examples 3-5 provided suitable performance for controlling hard water scale accumulation in an alkaline detergent applications.

Example 2

A beaker test was employed to evaluate calcium carbonate inhibition for food and beverage applications. A hardness solution was prepared by dissolving 33.45 g of $CaCl_2$)-$2H_2O$ and 23.24 g of $MGCl_2$-$6H_2O$ in deionized water in a 1 L volumetric flask filled to volume. A sodium bicarbonate solution was prepared by dissolving $NaHCO_3$-$2H_2O$ in DI water in a 1 L volumetric flask filled to volume.

A beaker was placed on a heat plate/stirrer. To the beaker, 1000 ml deionized water and 5.00 ml of the sodium bicarbonate solution were added. The contents of the beaker were heated to 85° F. and then the hardness solution was added to provide a water harness of 17 grains. Then each component of the evaluated samples shown in Table 4 were added (4 ml, equivalent to 0.4% or 1 ounce/2 gallons) to the contents of the beaker in the identified concentrations.

Exemplary samples 4 and 6 provide positive controls, providing a PBTC sodium salt instead of the PSO according to the invention.

TABLE 4

| Raw material | Ex 4 | Ex 5 | Ex 6 | Ex 7 | Control |
|---|---|---|---|---|---|
| Sodium hydroxide | 4000 ppm | 4000 ppm | 4000 ppm | 4000 ppm | 4000 ppm |
| Bayhibit N (41%): PBTC Na salt | 400 ppm | — | 400 ppm | — | — |
| PSO adducts, 40% | — | 400 ppm | — | 400 ppm | — |
| Acusol 1000 (48%): polyacrylic acid | — | — | 476 ppm | 476 ppm | — |
| pH | 12.6 | 12.6 | 12.6 | 12.6 | 12.6 |

After the Sample was completely mixed into the beaker, an initial transmittance measurement at 560 nm was taken at 85° F., 140° F., and 160° F. The Sample was then allowed to cool to room temperature before a final measurement was taken.

A "Clear" Sample as set forth in the tables below indicates that the beaker contents had a light transmission of at least about 95% when tested at 85° F., 140° F., 160° F. and room temperature, and was visibly clear without noticeable haziness, discoloration or precipitant formation. The fact that a particular sample was not indicated as being clear does not necessarily mean that the sample did not prevent scale. Rather, those sample that are indicated as being clear provide optimum scale protection under the conditions created in the experiment.

The results are shown in Table 5.

TABLE 5

| | 85° F. | 140° F. | 160° F. | 85° F. average (St Dev) | 140° F. average (St Dev) | 160° F. average (St Dev) |
|---|---|---|---|---|---|---|
| Control | 96.2 | 683 | 66.2 | 95.6 | 67.9 | 66.05 |
| Control | 95 | 67.5 | 65.9 | (0.85) | (0.57) | (0.21) |
| EXP 4 | 99.4 | 97.6 | 97.3 | 99.45 | 96.75 | 97 |
| EXP 4 | 99.5 | 95.9 | 96.7 | (0.07) | (1.2) | (0.42) |
| EXP 5 | 95.5 | 94.3 | 93.8 | 95.85 | 93.95 | 93.75 |
| EXP 5 | 96.2 | 93.6 | 93.7 | (0.49) | (0.49) | (0.07) |
| EXP 6 | 99.5 | 99.4 | 99.4 | 99.4 | 99.35 | 99.35 |
| EXP 6 | 99.3 | 99.3 | 99.3 | (0.14) | (0.07) | (0.07) |

TABLE 5-continued

| | 85° F. | 140° F. | 160° F. | 85° F. average (St Dev) | 140° F. average (St Dev) | 160° F. average (St Dev) |
|---|---|---|---|---|---|---|
| EXP 7 | 99.9 | 99.6 | 99.5 | 99.85 | 99.5 | 99.45 |
| EXP 7 | 99.8 | 99.4 | 99.4 | (0.07) | (0.14) | (0.07) |

The results in Table 5 show the exemplary sample 5 according to an embodiment of the invention provided similar calcium carbonate inhibition as the positive control (sample 4 containing the PBTC sodium salt instead of the PSO according to the invention) at 85° F., 140° F., and 160° F. Additionally, exemplary sample 7 according to an embodiment of the invention provided similar calcium carbonate inhibition as the positive control (sample 6 containing the PBTC sodium salt and polyacrylate instead of the PSO/polyacrylate according to the invention) at 85° F., 140° F., and 160° F. All samples containing the polymer and/or phosphonate outperformed the Control (averaged results).

Example 3

Hard water tolerance testing was conducted using formulations with the PSO adducts according to the invention in comparison to the formulations without the PSO adducts. The evaluated formulations are shown below in Table 6 wherein alkaline cleaning compositions including silicate and hydroxide alkalinity sources were combined with the PSO adducts and compared to the formulations without the PSO adducts (Control).

TABLE 6

| | EXP 8 | Control |
|---|---|---|
| DI water | 30-60 | 30-60 |
| NaOH 50% | 10-20 | 10-20 |
| Sodium Silicate Solution | 0.5-2 | 0.5-2 |
| PSO adducts, 40% | 1-5 | 0 |
| Sodium Hypochlorite, 10% | 20-40 | 20-40 |
| Additional Functional Ingredients | 5-10 | 5-10 |
| | 100.00 | 100 |

The formulations were combined with water sources having increasingly hard water (i.e. grains per gallon) as shown in Table 7. The hardness tolerance testing of the EXP 8 formulation and the control were conducted using 1% solutions in water with varying degrees of synthetic hardness created by adding various amounts of dissolved $CaCl_2$) and $MgCl_2$ to a combination of deionized water and $NaHCO_3$. Once the solutions reached 140° F. they were removed from the heat and let stand for 30 minutes. A failure was characterized by the presence of visible flocculent after the 30 minutes, whereas a passing evaluation was characterized by the absence of visible flocculent after the 30 minutes. The results are shown in Table 7.

TABLE 7

| Water source | Grains per gallon | EXP 8 | Control |
|---|---|---|---|
| synthetic hard water | 17 | Pass | Pass |
| synthetic hard water | 18 | Pass | Fail |
| synthetic hard water | 19 | Pass | Fail |
| Reverse osmosis reject water (Eagan, MN) | 22 | Pass | Fail |
| Reverse osmosis reject water (Eagan, MN) | 24 | Pass | Fail |
| Reverse osmosis reject water (Eagan, MN) | 26 | Fail | Fail |
| Reverse osmosis reject water (Eagan, MN) | 28 | Fail | Fail |

As shown in Table 7, the results indicate that the PSO-containing formulation of the alkaline detergent composition prevents hard water scale accumulation at hardness levels up to at least 24 grains, whereas the Control alkaline detergent formulation only prevented hard water scale accumulation at hardness levels up to 17 grains.

Example 4

Testing to evaluate hard water tolerance of exemplary formulations of a high-foaming, higher alkaline chlorinated cleaner (with and without PSO) was conducted to determine the impact of the PSO on hard water tolerance. The evaluated formulations are shown below in Table 8 wherein alkaline cleaning compositions including hydroxide alkalinity sources were combined with the PSO adducts and compared to the formulations without the PSO adducts (Control).

TABLE 8

| | EXP 9 | Control |
|---|---|---|
| DI water | 25-50 | 25-50 |
| NaOH 50% | 10-30 | 10-30 |
| PSO adducts, 40% | 1-5 | 0 |
| Lauryl dimethylamine oxide 30% | 5-10 | 5-10 |
| Sodium Hypochlorite, 10% | 20-40 | 20-40 |
| Additional Functional Ingredients | 5-10 | 5-10 |
| | 100.00 | 100 |

The hardness tolerance testing of the EXP 9 formulation and the control were conducted using 1% solutions in water with varying degrees of synthetic hardness created by adding various amounts of dissolved $CaCl_2$) and $MgCl_2$ to a combination of deionized water and $NaHCO_3$. Once the solutions reached 140° F. they were removed from the heat and let stand for 30 minutes. A failure was characterized by the presence of visible flocculent after the 30 minutes, whereas a passing evaluation was characterized by the absence of visible flocculent after the 30 minutes. The results are shown in Table 9.

TABLE 9

| Water source | Grains per gallon | EXP 9 | Control |
|---|---|---|---|
| Synthetic hard water | 16 | Pass | Pass |
| Synthetic hard water | 17 | Pass | Pass |
| Synthetic hard water | 18 | Pass | Fail |
| Synthetic hard water | 19 | Pass | Fail |
| Synthetic hard water | 20 | Fail | — |
| Synthetic hard water | 21 | Fail | — |
| Synthetic hard water | 22 | Fail | — |
| Synthetic hard water | 23 | Fail | — |

As shown in Table 10, the exemplary high-foaming formulation (EXP 9) according to the invention containing the PSO adducts had increased hard water tolerance over cleaning compositions not containing the PSO adducts.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method of reducing or preventing hardness accumulation on a hard surface comprising:

contacting a hard surface with a detergent composition comprising a phosphinosuccinic acid adduct comprising a phosphinosuccinic acid and mono-, bis- and oligomeric phosphinosuccinic acid adducts; an alkalinity source comprising an alkali metal hydroxide, metasilicate, and/or silicate; and an oxidizing agent comprising a chlorine, a hypochlorite and/or a chloramine, wherein a use solution of the detergent composition has a pH between about 10 and 13.5; and reducing and/or preventing hardness build up on the hard surface.

2. The method of claim 1, wherein the phosphinosuccinic acid adduct comprises at least 10 mol % of an adduct comprising a ratio of succinic acid to phosphorus from about 1:1 to 20:1.

3. The method of claim 1, wherein the phosphinosuccinic acid adduct comprises the following formulas of phosphinosuccinic acid adducts:

(I)

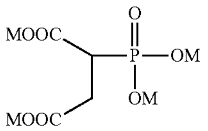

(II)

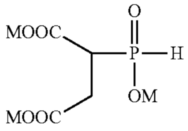

(III)

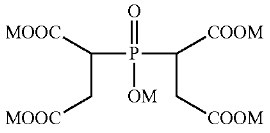

(IV)

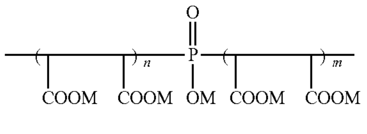

wherein M is selected from the group consisting of $H^+$, $Na^+$, $K^+$, $NH_4^+$, and mixtures thereof, wherein m plus n is greater than 2.

4. The method of claim 3, wherein the phosphinosuccinic acid adduct of formula I constitutes between about 1-40 wt-% of the phosphinosuccinic acid adduct, the phosphinosuccinic acid adduct of formula II constitutes between about 1-25 wt-% of the phosphinosuccinic acid adduct, the phosphinosuccinic acid adduct of formula III constitutes between about 10-60 wt-% of the phosphinosuccinic acid adduct, the phosphinosuccinic acid adduct of formula IV constitutes between about 20-70 wt-% of the phosphinosuccinic acid adduct.

5. The method of claim 1, wherein the phosphinosuccinic acid adduct constitutes between about 0.1-40 wt-% of the detergent composition, the alkalinity source constitutes between about 1-90 wt-% by weight of the detergent composition, and further comprises an anionic surfactant and/or a polycarboxylic acid polymer and/or hydrophobically modified polycarboxylic acid polymer.

6. The method of claim 1, further comprises the first step of generating a use solution of the detergent composition comprising from about 100 ppm to about 20,000 ppm of the alkalinity source, from about 1 ppm to about 2,000 ppm of the phosphinosuccinic acid adducts, wherein the hard surface contacted with the detergent composition use solution is an interior or exterior hard surface.

7. The method of claim 1, wherein the reducing and/or preventing hardness build up on the hard surface is using a clean-in-place cleaning technique.

8. The method of claim 7, wherein the hard surface comprises the internal components of tanks, pipes, lines, pumps, storage reservoirs, food and/or beverage processing equipment, or a combination thereof.

9. The method of claim 7, wherein the hard surface comprises evaporators, heat exchangers, heating coils, recrystallizers, pan crystallizers, spray dryers, drum dryers, tanks, or a combination thereof.

10. The method of claim 1, wherein the contacting of the hard surface is with the use solution of the detergent composition.

11. A method of reducing or preventing hardness accumulation on a hard surface in a food, beverage and/or pharmaceutical cleaning application comprising:

contacting a hard surface within the application with an alkaline detergent composition comprising: a phosphinosuccinic acid adduct comprising a phosphinosuccinic acid and mono-, bis- and oligomeric phosphinosuccinic acid adducts; an alkalinity source comprising an alkali metal hydroxide, metasilicate, and/or silicate; and an oxidizing agent comprising a chlorine, a hypochlorite and/or a chloramine, wherein a use solution of the detergent composition has a pH between about 10 and 13.5; and reducing and/or preventing hardness build up on the treated hard surface using a clean-in-place cleaning technique.

12. The method of claim 11, wherein the phosphinosuccinic acid adduct comprises the following formulas of phosphinosuccinic acid adducts:

(I)

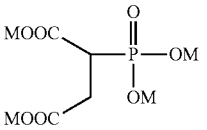

(II)

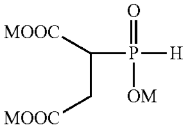

(III)

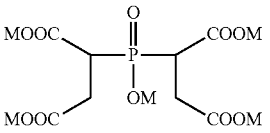

-continued (IV)

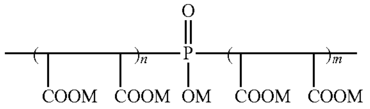

wherein M is selected from the group consisting of $H^+$, $Na^+$, $K^+$, $NH_4^+$, and mixtures thereof, wherein m plus n is greater than 2, and wherein the phosphinosuccinic acid adduct of formula I constitutes between about 1-40 wt-% of the phosphinosuccinic acid adduct, the phosphinosuccinic acid adduct of formula II constitutes between about 1-25 wt-% of the phosphinosuccinic acid adduct, the phosphinosuccinic acid adduct of formula III constitutes between about 10-60 wt-% of the phosphinosuccinic acid adduct, the phosphinosuccinic acid adduct of formula IV constitutes between about 20-70 wt-% of the phosphinosuccinic acid adduct.

13. The method of claim 11, wherein the alkaline detergent composition further comprises an anionic surfactant and/or a polycarboxylic acid polymer and/or hydrophobically modified polycarboxylic acid polymer.

14. The method of claim 11, comprising the additional step of combining a commodity sodium hydroxide source with the phosphinosuccinic acid adduct and/or additional alkalinity sources to form the use solution of the detergent composition having the pH between about 10 and 13.5.

15. The method of claim 11, wherein the use solution of the detergent composition comprises from about 1000 ppm to about 20,000 ppm of the alkalinity source, and from about 1 ppm to about 2,000 ppm of the phosphinosuccinic acid adducts.

16. The method of claim 11, wherein the use solution of the detergent composition comprises from about 500 ppm to about 10,000 ppm of the alkalinity source, from about 1 ppm to about 500 ppm of the phosphinosuccinic acid adducts, and from about 1 ppm to about 500 ppm of polymer.

17. The method of claim 11, wherein the hard surface comprises the internal components of tanks, pipes, lines, pumps, storage reservoirs, food and/or beverage processing equipment, or a combination thereof.

18. The method of claim 11, wherein the hard surface comprises evaporators, heat exchangers, heating coils, recrystallizers, pan crystallizers, spray dryers, drum dryers, tanks, or a combination thereof.

19. The method of claim 11, wherein the contacting of the hard surface is with the use solution of the detergent composition.

20. The method of claim 19, wherein the use solution of the detergent composition contacts the hard surface prior to resuming the normal operation of the food, beverage and/or pharmaceutical cleaning application.

* * * * *